United States Patent
Griffey et al.

(10) Patent No.: US 7,094,478 B1
(45) Date of Patent: Aug. 22, 2006

(54) MAGNETIC DAMPING

(75) Inventors: Kevin W. Griffey, West Chicago, IL (US); Gregory Pardus, Darien, IL (US); Ahid D. Nashif, Cincinnati, OH (US); Edwin F. Aquino, Chicago, IL (US)

(73) Assignee: Material Sciences Corporation, Engineered Materials and Solutions Group, Inc., Elk Grove Village, IL (US)

( * ) Notice: Subject to any disclaimer, the term of this patent is extended or adjusted under 35 U.S.C. 154(b) by 86 days.

(21) Appl. No.: 10/242,989

(22) Filed: Sep. 13, 2002

(51) Int. Cl.
*B32B 15/08* (2006.01)

(52) U.S. Cl. .................. 428/692.1; 428/212; 428/457; 428/465

(58) Field of Classification Search ............... 428/323, 428/332, 416, 457–468
See application file for complete search history.

(56) References Cited

U.S. PATENT DOCUMENTS

| | | | |
|---|---|---|---|
| 3,424,270 A | 1/1969 | Hartman et al. | |
| 3,817,356 A | 6/1974 | Dahlquist | |
| 4,216,505 A | 8/1980 | Grant et al. | |
| 4,233,073 A | 11/1980 | Takemura | |
| 5,258,972 A | 11/1993 | Brasfield et al. | |
| 5,300,355 A * | 4/1994 | Mifune et al. | 428/215 |
| 5,695,867 A | 12/1997 | Saitoh et al. | |
| 5,855,353 A | 1/1999 | Shaffer et al. | |
| 5,939,179 A * | 8/1999 | Yano et al. | 428/212 |
| 5,984,043 A | 11/1999 | Ruhe et al. | |
| 6,110,985 A | 8/2000 | Wheeler | |
| 2001/0044023 A1 * | 11/2001 | Johnson et al. | 428/354 |

FOREIGN PATENT DOCUMENTS

| | | | |
|---|---|---|---|
| EP | 0 516 387 | | 12/1992 |
| EP | 0849495 A2 * | | 6/1998 |
| JP | 3047750 | | 2/1991 |
| JP | 03-047750 | * | 3/1991 |

OTHER PUBLICATIONS

Cowie, J. (Polymers: Chemistry & Physics of Modern Materials, 2nd Ed., Blackie and Sons, LTD, USA, 1991), title pages and p. 275.*
Google web search form (Google search: modulus regidity elasticity).*
Document titled "Table 000", reproduction of Table from Singley, Mech. Eng. Design, 1980, McGraw Hill.*
Document titled "glossary of materials testing terms: 1-o" from Instron (pp. 1-3).*

* cited by examiner

*Primary Examiner*—Kevin M. Bernatz
(74) *Attorney, Agent, or Firm*—Seyfarth Shaw LLP

(57) ABSTRACT

A vibration damping laminate includes a magnetic layer and an uncoated constraining layer joined by a viscoelastic layer, wherein the modulus of elasticity of the viscoelastic layer is substantially less than that of either of the other two layers. The laminate is magnetically attached to an associated source of vibrations by the magnetic layer, and substantially all vibrational damping is effected by the viscoelastic layer.

14 Claims, 1 Drawing Sheet

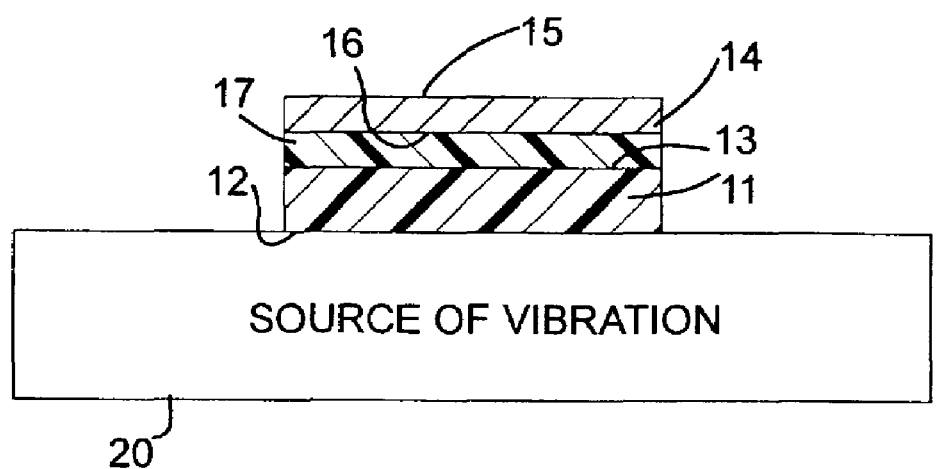

MAGNETIC DAMPING

BACKGROUND

This application relates to the vibration damping materials for minimizing vibrations in structural members, and relates in particular to vibration damping laminates.

Structural vibration can occur in a wide variety of structural members. Common deleterious results of such vibration can be mechanical failure of the structural element and/or the generation of acoustic noise. One method commonly employed to reduce such vibration involves the addition of damping material to a vibrating structure. This is referred to as add-on damping, and typically consists of a piece of metal or the like applied to the vibrating structure by means of a pressure-sensitive adhesive. Such add-on damping typically works on the principal of constrained layer damping, which is commonly a three-layer construction consisting of the vibrating source, a viscoelastic layer, such as the pressure-sensitive adhesive, and a constraining layer, such as the piece of metal. The vibrating source provides the unwanted vibrational energy, which causes the outer constraining layer or a piece of metal to shear the viscoelastic layer, causing friction (heat) between the polymer chains of the viscoelastic layer, thereby dissipating the energy. Thus, the viscoelastic layer has two purposes: adhesion of the constraining layer to the vibrating source and vibration reduction.

However, when such an add-on damping material is utilized, pressure is needed during attachment of the damping material to the vibrating source to ensure cold temperature adhesion.

It is known to provide a three-layer damping material, including a constraining layer, a viscoelastic adhesive layer and a magnetic layer, such an arrangement being disclosed, for example, in U.S. Pat. No. 5,300,355 to Mifune et al. In that arrangement, the magnetic layer is formed of a composite which includes, in addition to a magnetic powder, a polymeric material and an adhesive resin. Thus, the composite magnetic layer achieves both a magnetic and an adhesive attachment of the damping laminate to the vibrating source. Furthermore, the material is designed so that the modulus of elasticity of the magnetic layer is equal to or less than that of the adhesive layer so that most of the vibrational damping is effected in the magnetic layer.

Japanese patent publication no. 3-47750, referred in U.S. Pat. No. 5,300,355, discloses a similar arrangement, wherein the metal layer is primed and coated with a rust preventive coating.

SUMMARY

This application describes a laminated magnetic damping material which avoids disadvantages of prior damping laminates while affording additional structural and operating advantages.

An aspect is the provision of a vibration damping material, which can be readily coupled to a source of vibrations without the use of adhesives.

A further aspect is the provision of a damping material of the type set forth, which can be coupled to a source of vibration without the application of force.

A further aspect is the provision of a vibration damping laminate wherein substantially all of the vibration damping occurs in a viscoelastic layer spaced from the source of vibrations.

Yet another aspect is the provision of a method of damping vibrations utilizing damping material of the type set forth.

Certain ones of these and other aspects may be attained by providing a vibration damping material comprising a magnetic layer having a first modulus of elasticity and having first and second opposite surfaces wherein the first surface is adapted to be magnetically coupled to an associated source of vibration, an uncoated constraining layer having a second modulus of elasticity substantially greater than the first modulus of elasticity, and a viscoelastic layer joining the constraining layer to the second surface of the magnetic layer, the viscoelastic layer having a third modulus of elasticity substantially less than the first modulus of elasticity so that substantially all vibrational damping is effected in the viscoelastic layer.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

The sole figure is a diagrammatic illustration of a vibration damping laminate coupled to a source of vibration.

DETAILED DESCRIPTION

Referring to the drawing, there is shown a laminated damping material 10 coupled to a source of vibrations 20.

The damping material 10 is a three-layer laminate including a magnetic layer 11 having an outer surface 12 and an inner surface 13. The material also includes a constraining layer 14 having an outer surface 15 and an inner surface 16. Interposed between the magnetic layer 11 and the constraining layer 14 and joining them is a viscoelastic layer 17, which adhesively joins the inner surface 13 of the magnetic layer 11 with the inner surface 16 of the constraining layer 14.

The magnetic layer 11 consists of a magnetic polymer material which may include approximately 90% by weight of a magnetic powder and 10% by weight of a polymer binder. The magnetic powder may be ferrite, rare earth powder or any material with favorable magnetic properties. The polymer binder material may be selected from a wide variety of polymeric, elastomeric and plastic materials. The binder provides a flexible connection for the magnetic powder. In particular, it is desirable to provide a rigid connection between the magnetic layer 11 and the source of vibrations 20. The rigidity of the magnetic layer 11 allows an easy path for vibrational energy to transfer into the viscoelastic layer 17. This means the modulus of elasticity and stiffness of the magnetic layer 11 is greater than that of the viscoelastic layer 17 for the operating temperature of the system. The magnetic layer 11 may have a thickness in the range of from about 0.010 inch to about 0.060 inch. The magnetization of this layer may be one-sided or two-sided, with the poles of magnetization spaced to optimize magnetic strength. This layer may be formed of a flexible magnetic material, such as material of types sold by Flexmag Industries, Inc.

The constraining layer 14 may comprise any suitable metal, plastic or composite material and have any of a wide variety of thicknesses. This layer provides the moment of inertia to shear the viscoelastic layer. In most cases, this constraining layer 14 will be relatively thin compared to the magnetic layer, and typically has a modulus of elasticity much higher than that of any of the other layers. The thickness of the constraining layer may be in the range of from about 0.005 inch to about 0.030 inch, and it may be formed of metal, such as steel, stainless steel or aluminum. This layer, and particularly the inner surface 16 thereof, is preferably uncoated.

The viscoelastic layer 17 may be formed of a wide range of viscoelastic materials, i.e., materials designed to operate in a rubbery state throughout the operating temperature of a system. The mechanical properties of the viscoelastic layer 17, such as vibration damping, will be similar to rubber for the operating temperature range of the system. The viscoelastic material will behave like a liquid at higher temperatures and a solid at lower temperatures. Viscoelastic materials may be polymeric, elastomeric, or amorphous glassy materials. Rubbers, silicones, acrylics and mastics are common viscoelastic materials. The purpose of this layer is to provide vibration reduction by converting the vibrational energy into heat through internal friction of the polymer chains. The viscoelastic layer 17 may have a thickness in the range from about 0.001 inch to about 0.008 inch, but the thickness may vary, depending upon the particular application.

In an embodiment of the laminated damping material 10, each of the layers 11, 14 and 17 has a modulus of elasticity (Young's Modulus) which bears a predetermined relationship with those of the other layers. In particular, the magnetic layer 11 has a modulus of elasticity which is greater than that of the viscoelastic layer 17, but less than that of the constraining layer 15. The modulus of elasticity may be measured in Newtons per square meter, or Pascals (Pa) or in pounds per square inch (psi). In an embodiment, the magnetic layer 11 has a modulus of elasticity in the range of from about $21 \times 10^6$ Pa to about $21 \times 10^9$ Pa, i.e., from about $3 \times 10^3$ psi to about $3 \times 10^6$ psi. The constraining layer 15 may have a modulus of elasticity of about $2 \times 10^{11}$ Pa, i.e., about $29 \times 10^6$ psi. The viscoelastic layer 17 may have a modulus of elasticity in the range of from about $21 \times 10^3$ Pa to about $2.1 \times 10^8$ Pa, i.e., from about 3 psi to about 300,000 psi. These are general ranges. It is important to note that the moduli of elasticity of the magnetic layer 11 and the viscoelastic layer 17 overlap, because both materials have polymer characteristics and experience different modulus values, depending upon the temperature. The above-listed ranges would be suitable for a system designed around an operating temperature of certain household appliances, such as clothes washing machines or dryers.

In operation, the outer surface 12 of the magnetic layer 11 is magnetically coupled to the source of vibrations 20, thereby providing an effective coupling without the use of adhesives or without requiring application of clamping or compressive forces. This magnetic coupling provides a much easier attachment under cold temperatures and requires no pressure to obtain adhesion. The vibrational damping is effective predominantly in the viscoelastic layer 17, by conversion of the vibrational energy of the source 20, coupled through the relatively stiff magnetic layer 11, into heat through internal friction of the polymer chains in the viscoelastic layer 17.

From the foregoing, it can be seen that there has been provided an improved laminated damping material which can be simply and easily coupled to a vibrational source over a wide range of temperatures without the application of pressure and which affords effective vibrational damping in a simple and economical construction.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims, when viewed in their proper perspective based on the prior art.

What is claimed is:

1. A vibration damping material comprising:
    a magnetic layer having a first modulus of elasticity and having first and second opposite surfaces wherein the magnetic layer has only single-sided magnetization adjacent to the first surface and the first surface is adapted to be magnetically coupled to an associated source of vibration,
    an uncoated constraining layer having a second modulus of elasticity greater than the first modulus of elasticity, and
    a non-magnetic viscoelastic layer joining the constraining layer to the second surface of the magnetic layer, the viscoelastic layer having a third modulus of elasticity less than the first modulus of elasticity so that substantially all vibrational damping is effected in the viscoelastic layer.

2. The material of claim 1, wherein the magnetic layer is substantially thicker than any other layer.

3. The material of claim 2, wherein the magnetic layer has a thickness in the range of from about 0.01 inch to about 0.06 inch.

4. The material of claim 1, wherein the magnetic layer includes a magnetic powder and a binder.

5. The material of claim 4, wherein the magnetic layer is about 90% magnetic powder by weight.

6. The material of claim 1, wherein the magnetic layer has double-sided magnetization adjacent to the first and second surfaces.

7. The material of claim 1, wherein the constraining layer has a thickness in the range of from about 0.005 inch to about 0.030 inch.

8. The material of claim 1, wherein the constraining layer is substantially rigid.

9. The material of claim 1, wherein the viscoelastic layer has a thickness in the range of from about 0.0005 inch to about 0.0080 inch.

10. A method of damping vibrations emanating from a source of vibration comprising the steps of:
    providing a laminate of a magnetic layer and an uncoated constraining layer joined by a non-magnetic viscoelastic layer wherein the viscoelastic layer has a modulus of elasticity less than that of either of the other two layers so that substantially all vibration damping is effected in the viscoelastic layer, and
    magnetically attaching the magnetic layer to the associated source of vibration wherein there is provided a laminate such that the magnetic layer has only single-sided magnetization on the side attached to the source of vibration.

11. The method of claim 10, wherein a side of the magnetic layer opposite the viscoelastic layer is attached to the associated source of vibration.

12. The method of claim 11, wherein magnetic attachment is the sole means of attachment of the laminate to the source of vibration.

13. The method of claim 10, wherein there is provided a laminate having a magnetic layer which is substantially thicker than any other layer.

14. A vibration damping material comprising:
a magnetic layer having a first modulus of elasticity in the range of from about 3,000 psi to about 3,000,000 psi and having first and second opposite surface wherein the first surface is adapted to be magnetically coupled to an associated source of vibration and the magnetic layer has only single-sided magnetization adjacent to the first surface, a constraining layer having a modulus of elasticity of about 29,000,000 psi, and a non-magnetic viscoelastic layer joining the constraining layer to the second surface of the magnetic layer, the viscoelastic layer having a third modulus of elasticity in the range of from about 3 psi to about 300,000 psi so that substantially all vibrational damping is effected in the viscoelastic layer.

* * * * *